United States Patent [19]

Hisanaga et al.

[11] Patent Number: 5,243,941
[45] Date of Patent: Sep. 14, 1993

[54] ACTUATOR FOR ENGINE IDLING CONTROL MECHANISM

[75] Inventors: Naogi Hisanaga, Kosai; Osamu Terakura, Nagoya; Yuji Nakano, Toyota; Michio Koshimizu, Kariya, all of Japan

[73] Assignee: Asmo Co., Ltd., Kosai, Japan

[21] Appl. No.: 922,172

[22] Filed: Jul. 28, 1992

[30] Foreign Application Priority Data

Jul. 29, 1991 [JP] Japan .................. 3-189054

[51] Int. Cl.$^5$ .............................................. F02M 3/00
[52] U.S. Cl. .............................................. 123/339
[58] Field of Search ............... 123/339, 617, 643, 414; 324/208

[56] References Cited

U.S. PATENT DOCUMENTS

| 3,675,636 | 7/1972 | Hiori | 123/617 |
|---|---|---|---|
| 3,757,754 | 9/1973 | Wiegand | 123/617 |
| 4,155,340 | 5/1979 | Ferrquist et al. | 123/617 |
| 4,212,272 | 7/1980 | Hawk | 123/339 |
| 4,395,985 | 8/1983 | Hagen | 123/339 |
| 4,655,180 | 4/1987 | Bauer et al. | 123/361 |
| 4,742,811 | 5/1988 | Okada et al. | 123/643 |
| 4,810,967 | 3/1989 | Yokoyama et al. | 324/208 |
| 4,901,697 | 2/1990 | Schleupan | 123/414 |
| 4,976,237 | 12/1990 | Bollinger | 123/339 |
| 5,186,142 | 2/1993 | Brunelli et al. | 123/339 |

FOREIGN PATENT DOCUMENTS

| 57-42129 | 4/1982 | Japan . |
|---|---|---|
| 61-27783 | 1/1986 | Japan . |
| 63-6732 | 7/1988 | Japan . |

Primary Examiner—Raymond A. Nelli
Attorney, Agent, or Firm—Stetina & Brunda

[57] ABSTRACT

An actuator for an engine idling control mechanism, which includes a throttle valve disposed in an intake manifold tube, a slidable plunger unit, a drive mechanism for forcibly sliding the plunger unit, a detecting device for detecting whether the throttle valve is open or closed, and a control unit for controlling the drive mechanism in relation to the detecting device, for properly setting the degree of opening of the throttle valve at the time the engine is idling. The plunger unit is designed in such a way that, when the throttle valve is closed, the plunger unit is pushed by a control lever which is positioned in accordance with the degree of opening of the throttle valve. The drive mechanism can set the degree of opening of the throttle valve through the plunger unit and the control lever. The detecting device includes a pair of magnets and a detector for detecting the magnetic flux of the magnets. The magnets are slidable in the same direction as the plunger unit, and are slid by the plunger unit when the throttle valve is closed, for adjusting the degree of opening of the throttle valve.

20 Claims, 17 Drawing Sheets

Fig.9 (A)
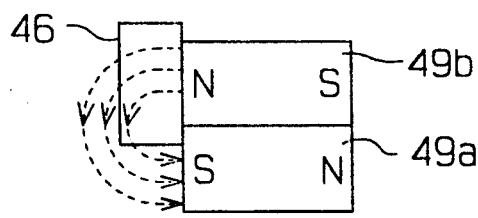
Direction of magnetic flux across the Hall element 46
Fig.9 (B)
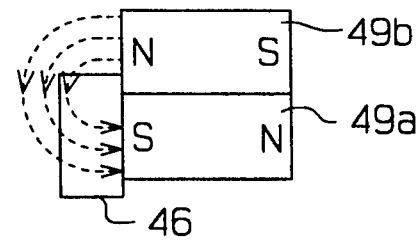
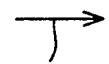
Direction of magnetic flux across the Hall element 46

5,243,941

ACTUATOR FOR ENGINE IDLING CONTROL MECHANISM

BACKGROUND OF THE INVENTION

This application claims the priority of Japanese Patent Application No. 3-189054 filed on Jul. 29, 1991, which is incorporated herein by reference.

FIELD OF THE INVENTION

The present invention generally relates to an actuator for an engine idling control mechanism. More particularly, this invention relates to an actuator for controlling the idling of the engine of a vehicle by controlling the degree of opening of a throttle valve.

DESCRIPTION OF THE RELATED ART

In general, a conventional fuel injection type engine for a vehicle receives air from the outside via an intake manifold tube including a throttle valve. The degree of opening of the throttle valve is generally proportional to the force applied on the acceleration pedal. When a driver steps off the acceleration pedal, the throttle valve becomes fully closed, and cuts off the air supply to the engine cylinders. In which event, since only vaporized gasoline is supplied to the engine cylinder, the air-fuel ratio becomes rich and the engine cannot maintain a stable idling condition.

To allow the engine to maintain a stable idling condition, it has been proposed to use an actuator, which is disclosed in Japanese Unexamined Patent Publication No. 61-277830 (corresponding to U.S. Pat. No. 4,655,180), and which is illustrated in FIG. 21. The actuator shown in FIG. 21 is designed to control the degree of opening of the throttle valve for preventing the air-fuel ratio from becoming excessively rich, when the acceleration pedal is not thrust forward. The operation of the actuator shown in FIG. 21 will be briefly described below.

As the throttle valve is closed, a control lever 91 which is interlocked with the throttle valve pushes a stopper 70 of the actuator in FIG. 21. This causes a slider 73 to move upward together with the stopper 70, against the force of a spring 71. At this time, a slidable contact member 74a and a fixed contact member 74b in a plunger 72, contact each other.

Provided at the center supporting portion of the actuator are a pair of conductors 77a and 77b that are connected to an electric control unit (ECU) (not shown). The slidable contact member 74a contacts the conductor 77a, while the fixed contact member 74b contacts the conductor 77b. Those two contact members 74a and 74b form a contact switch.

From the contact between the contact members 74a and 74b, the ECU detects that the throttle valve is fully closed, and activates a motor 78.

A motor shaft 79 is connected to the motor 78, and transmits a rotary movement to a toothed wheel 80. As the toothed wheel 80 rotates, an internal thread (or a female screw) formed in the inner wall of the toothed wheel 80, engages with an external thread (or a male screw) formed on the outer surface of the head portion of the plunger 72, for thrusting the plunger 72 downward.

A pair of tapered contact faces 72a and 73a are formed on the plunger 72 and the slider 73 respectively. When the plunger 72 is thrust downward, the contact faces 72a and 73a contact each other, and the stopper 70 moves the control lever 91 downward. As a result, the fully-closed throttle valve is opened slightly, for passing air supply to the engine cylinders. Thereafter, the ECU performs feedback control on the motor 78 based on data of the detected rotation speed of the engine, in order to set the engine at a predetermined idling speed.

When the acceleration pedal is thrust forward, the degree of opening of the throttle valve increases. At this time, the control lever 91 releases its pressure on the stopper 70. The stopper 70 then moves downward under the force of the spring 71, and separates the contact member 74a from the contact member 74b (i.e., the contact switch is off). From the OFF-status of the contact switch, the ECU detects that the throttle valve is opened, and terminates the driving control on the motor 78.

The foregoing conventional actuator requires that the contact member 74a contact the conductor 77a, that the contact member 74b contact the conductor 77b, and that both contact members 74a and 74b come in contact with each other, or break the contact in accordance with the upward or downward sliding motion of the slider 73. If a foreign matter enters between the contact member 74a and the conductor 77a, or between the contact member 74b and the conductor 77b, or between the contact members 74a and 74b, or if the contact faces of the individual members are not clean, no signal representing the ON status of the contact switch would be sent out, even when both contact members 74a and 74b are in contact with each other. In such a case, the ECU cannot properly control the idling operation of the engine.

Furthermore, Japanese Unexamined Utility Model Publication No. 57-42129 discloses another type of throttle control actuator. This actuator is illustrated in FIG. 22, and comprises a motor 92, a slidable drive shaft 93 interlocked with the throttle valve, a gear mechanism 94 for converting the motor rotation into a drive shaft sliding motion. A magnet 95 having an inclined surface 95a is fit on the drive shaft 93. A magnetic sensor 97 is housed in a casing 96 of the actuator.

The magnetic sensor 97 faces an arbitrary point on the inclined surface 95a, according to the sliding position of the drive shaft 93. The sensor 97 detects the magnetic flux in accordance with a distance between the facing point and the sensor 97, and outputs, to the ECU a sensing signal having a level corresponding to the magnitude of the detected magnetic flux. The ECU determines the position of the drive shaft 95, based on the magnitude of the sensing signal from the sensor 97.

Although the foregoing conventional type does not have the same defects as those included in the first conventional type, the sensor 97, it cannot detect small fluctuations in the magnetic flux based on small displacements of the drive shaft 93, and therefore it does not provide an accurate idling control.

SUMMARY OF THE INVENTION

It is therefore an object of the present invention to provide an actuator for an engine idling control mechanism, which accurately controls the degree of opening of a throttle valve when the engine is in the idling condition.

To achieve the foregoing and other objects in accordance with the purpose of the present invention, an improved actuator is provided for an engine idling control mechanism, which comprises a throttle valve disposed in an intake manifold tube, an adjusting unit operable by an operator to adjust the degree of opening of the throttle valve, and a control lever to be positioned in accordance with the degree of opening of the throttle valve.

The actuator includes a slidable plunger unit, a drive mechanism for forcibly sliding the plunger unit against the pressing force of the control lever, a detecting device for detecting an open/close status of the throttle valve, and a control unit for controlling the drive mechanism in response to the detecting device, in order to accurately control the throttle valve when the engine is in the idling condition.

The plunger unit is designed to be pushed by the control lever, at least when the throttle valve is closed. The drive mechanism can set the degree of opening of the throttle valve through the plunger unit and the control lever.

The detecting device includes a pair of magnets and a detector for detecting magnetic flux of the magnet. The magnets are disposent adjacent to each other such that two poles of different polarities are adjoined. One of the magnet pairs and the detector are slidable in the same direction as that of the plunger unit, and is caused to slide by the plunger unit when the throttle valve is closed. The detector detects a change in the magnetic flux when such sliding occurs.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIGS. 1 through 11 illustrate a first embodiment of the present invention, wherein:

FIG. 1 is a cross sectional view showing the internal structure of an actuator;

FIG. 2 is a plan view of the actuator in FIG. 1 with a cover and an inner plate removed therefrom;

FIG. 3 is a plan view of the actuator in FIG. 1 with the cover removed therefrom;

FIG. 4 is a cross-sectional view showing the actuator in FIG. 1 before the cover, a sealing plug and a plug stopper are attached thereto;

FIG. 5 is a partly enlarged cross sectional view showing the proximity of a Hall element and a pair of magnets;

FIG. 6 is a perspective view showing the shape of the pair of magnets;

FIG. 7 is a diagrammatic view of FIG. 5, illustrating a plunger, a toothed wheel and the magnets;

FIG. 8 is a graph showing the distribution of the magnetic flux of the magnets;

FIGS. 9(A) and 9(B) are diagrammatic illustrations for explaining the relationship between the Hall element and the magnetic flux of the magnets;

FIG. 10 is a plan view illustrating a space provided above the inner plate; and

FIG. 11 is a plan view of the cover;

FIGS. 12 through 16(A),(B) illustrate a second embodiment of the present invention, wherein:

FIG. 12 is a partly enlarged cross section showing the proximity of a Hall element, a pair of magnets and the upper portion of a toothed wheel;

FIG. 13 is a diagrammatic illustration of FIG. 12, illustrating a plunger, the toothed wheel and the magnets;

FIG. 14 is an enlarged cross sectional view illustrating the proximity of the magnets; and FIGS. 15, 16(A) and 16(B) are diagrammatic illustrations for explaining the advantages of the second embodiment;

FIGS. 17 through 20 illustrate further modifications of the present invention, wherein:

FIG. 17 is a perspective view of an adjusting screw in one modification according to the present invention:

FIG. 18 is a cross sectional view illustrating how the adjusting screw is attached to a toothed wheel;

FIG. 19 is an exploded perspective view showing the structure on the base portion of an inner plate and a connector plug member of; and FIG. 20 is a plan view illustrating how an engaging portion of the plug member is engaged with a cap;

DETAILED DESCRIPTION OF THE PREFERRED EMBODIMENTS

First Embodiment

A first embodiment of the present invention will now be described referring to FIGS. 1 through 11.

Figure 1:
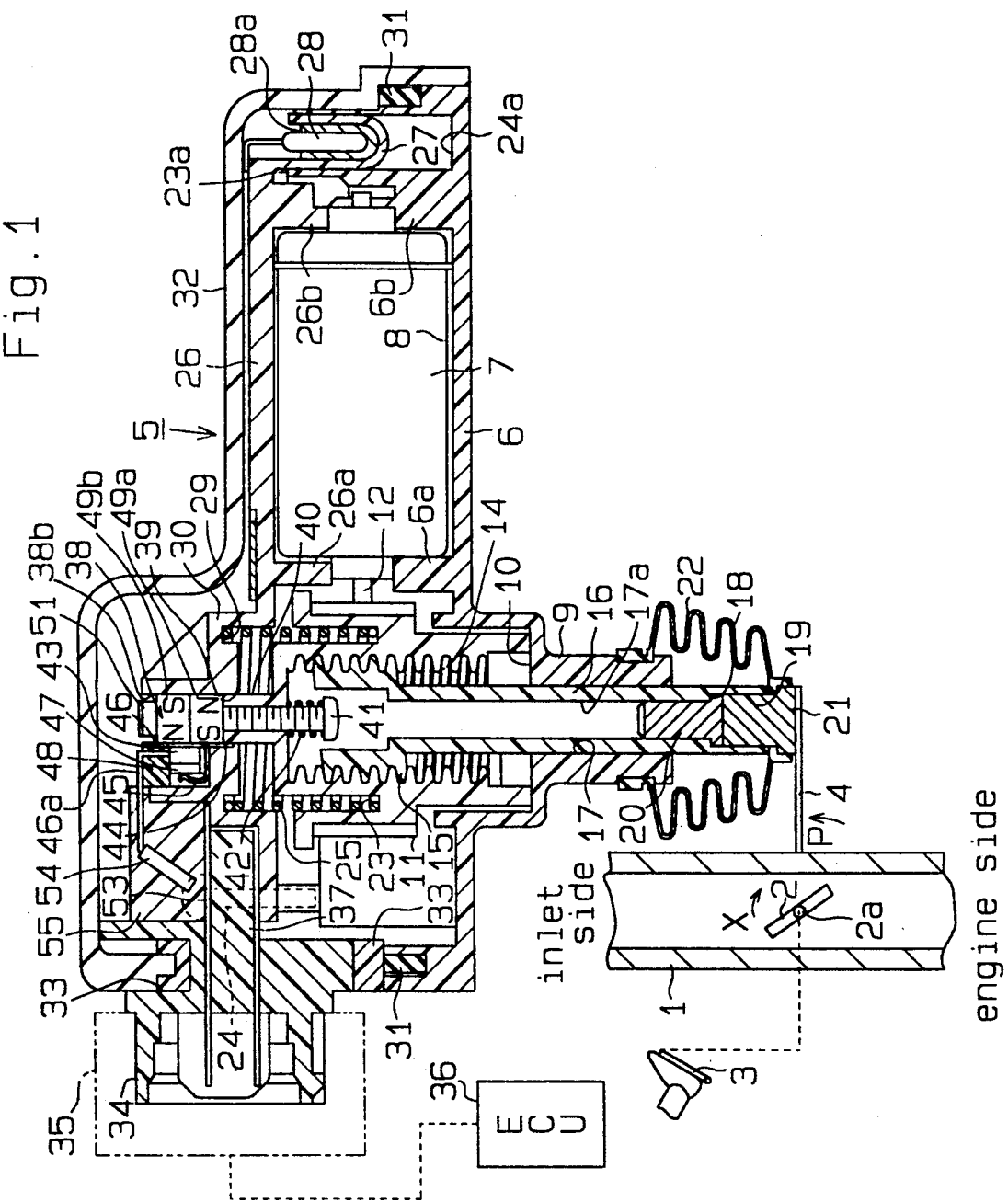

As shown in FIG. 1, a throttle valve 2 is provided in an intake manifold tube 1 for supplying air to an engine. The throttle valve 2 (i.e. a butterfly valve is rotatable around a pivot 2a) is interlocked with an acceleration pedal. The throttle valve 2 is turned in the direction of the arrow X when a driver steps on the acceleration pedal 3, and is turned in the direction opposite to the direction X by the action of a return spring (not shown), when the driver steps off the acceleration pedal 3. In other words, the degree of opening of the throttle valve 2 is a function of the force applied to the acceleration pedal 3.

When the driver steps off the acceleration pedal 3, the throttle valve 2 is turned in the closing direction. As the engine is idling, the degree of opening of the throttle valve 2 is adjusted according to the action of an actuator 5. The structure of the actuator 5 which ensures such opening control will now be described.

Provided on the pivot 2a of the throttle valve 2, is a control lever 4, which allows for the transmission of movement between the actuator 5 and the throttle valve 2. The control lever 4 is therefore turned in the direction opposite to the arrow direction P when the acceleration pedal 3 is thrust forward. When the thrusting force on the acceleration pedal 3 is removed, the control lever 4 is turned in the direction P to come in contact with the bottom portion of the actuator 5, pressing the actuator 5.

Figure 4:
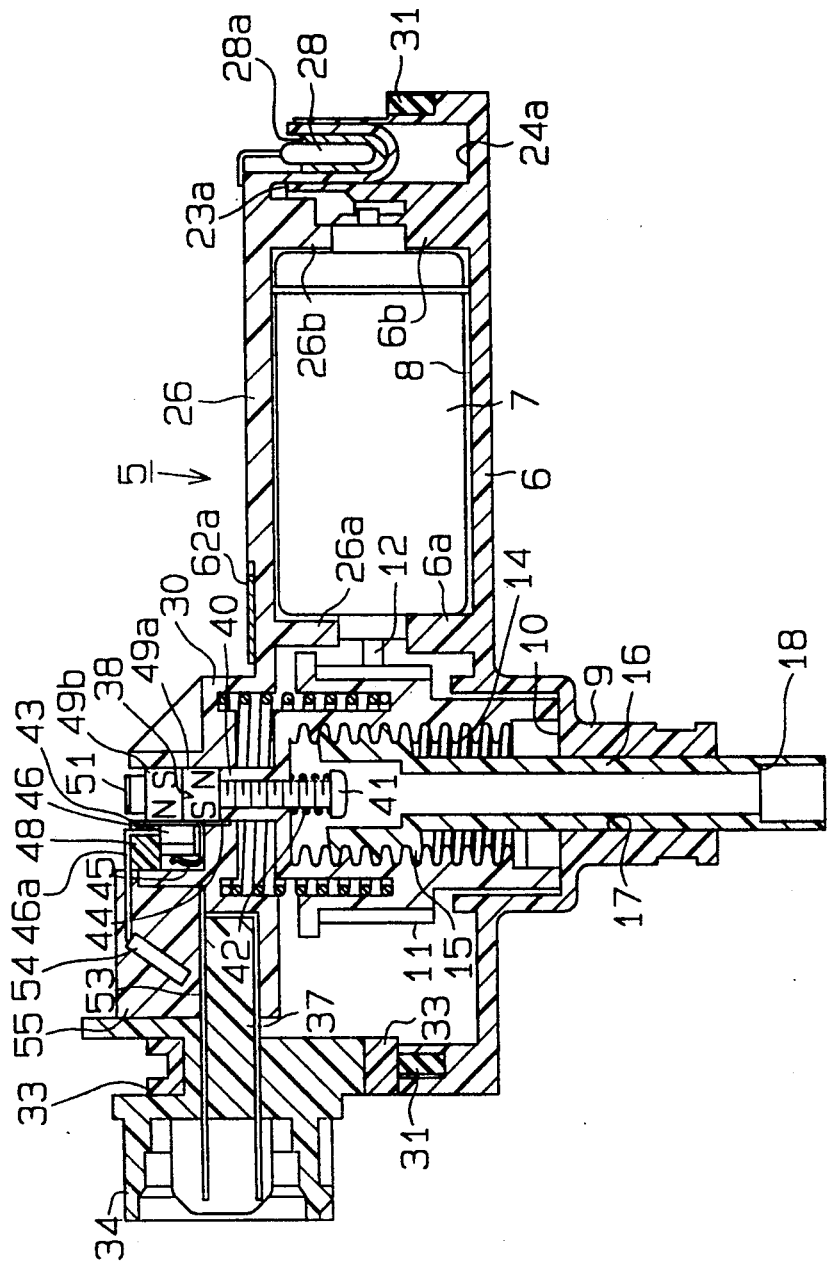

As shown in FIGS. 1 and 4, a bottom casing 6 of the actuator 5 has a pair of pedestals 6a and 6b formed integrally on the center and right-hand side thereof, respectively. A motor 7 is disposed in a receiving recess 8 formed between the pedestals 6a and 6b. The bottom casing 6 also has a projection 9 on the left-hand side, which protrudes downward from the bottom casing 6. The projection 9 has a generally cylindrical shape with a ring-shaped horizontal cross section, and has a receiving aperture 10 and an interior opening 17. The lower half of a rotatable toothed wheel 11 is fitted in the receiving aperture 10.

Figure 2:
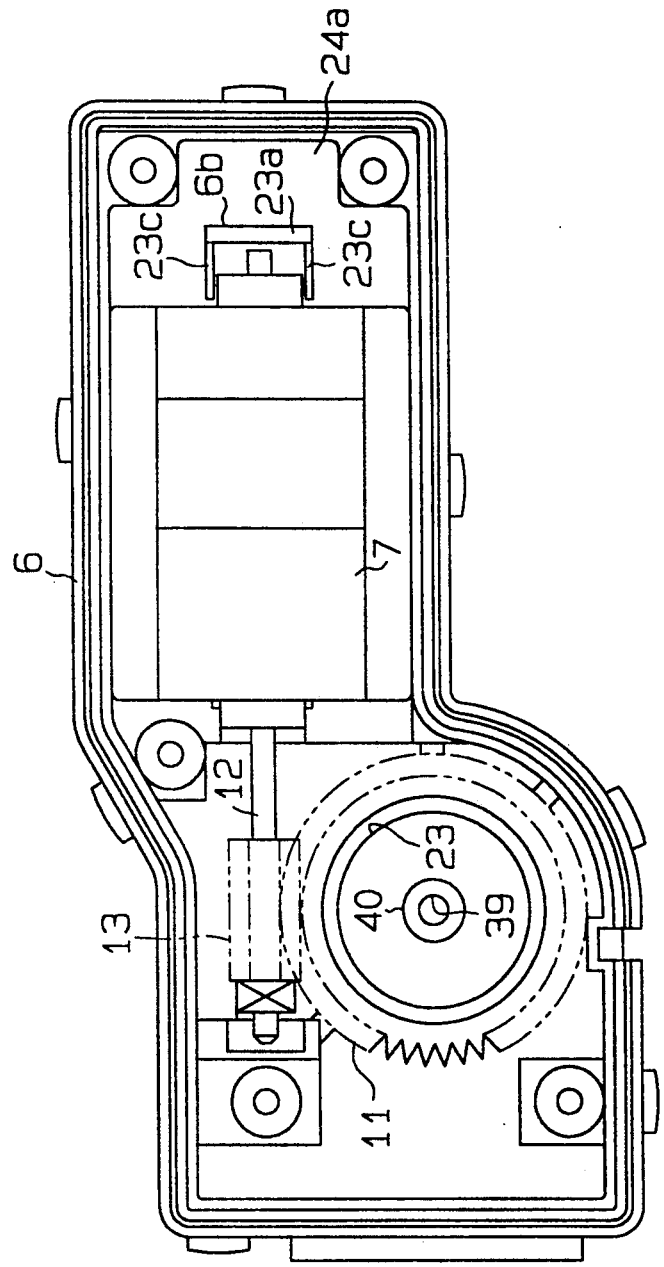

As shown in FIG. 2, a worm gear 13 is provided on a motor shaft 12 of the motor 7. This worm gear 13 engages the teeth formed on the outer surface of the toothed wheel 11. As the motor 7 is driven, the toothed wheel 11 is turned.

As shown in FIGS. 1, 2 and 4, the toothed wheel 11 has a top on which a circular first positioning recess 23 is formed, and an inner wall on which an internal thread 14 is formed and which has its lower portion open. An external thread 15 is formed on a plunger 16, and engages the internal thread 14. The lower end portion of the plunger 16 penetrates the penetrated opening 17 of the projection 9 to protrude below the bottom casing 6.

The plunger 16 has a first through opening 17a extending in the axial direction and a second through opening 19 having a larger inner diameter than the first through opening 17a. A sealing plug 20 is fitted in both through openings 17a and 19. The sealing plug 20 has a T-shaped vertical cross section, and engages a step 18 formed at the boundary between the through openings 17a and 19. A plug stopper 21 having a T-shaped vertical cross section is fitted also in the second through opening 19.

A bellows-shaped rubber sealing jacket 22 is provided at the bottom portion of the projection 9. The sealing jacket 22 has a top end secured to the periphery of the bottom portion of the projection 9, and a bottom end held between the bottom tip of the plunger 16 and the plug stopper 21. The sealing jacket 22 therefore prevents a foreign matter, such as dust, from entering the bottom casing 6 through the penetrated opening 17 of the projection 9, and through both openings 17a and 19 of the plunger 16.

As shown in FIGS. 1 and 2, the pedestal 6b has an elastic piece 23a extending upward, with a pair of pressing pieces 23c on corresponding sides of the elastic piece 23a. The bottom casing 6 has an insertion recess 24a formed on the right-hand side of the pedestal 6b.

Figure 3:
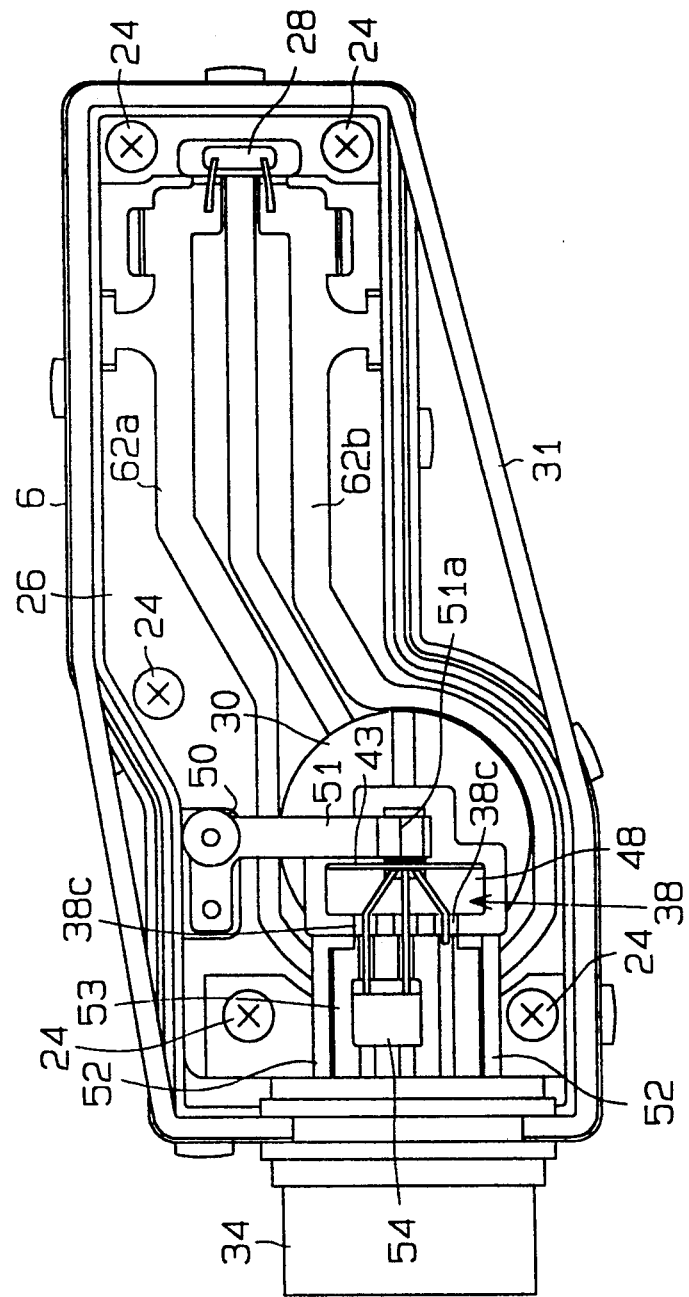

As shown in FIGS. 1, 3 and 4, an inner plate 26 is secured to the top of the bottom casing 6 by means of a plurality of screws 24. The inner plate 26 has pressing pieces 26a and 26b which are formed integrally at the lower sides and face the pedestals 6a and 6b, respectively. The pressing pieces 26a and 26b and the pedestals 6a and 6b securely hold the motor 7.

The inner plate 26 further has an inserting portion 27 with a U-shaped vertical cross section at the right end portion. A first capacitor 28 is fixed in the inserting portion 27 by means of a resin 28a filled therein. The first capacitor 28 is connected in parallel to the motor 7.

The inserting portion 27 is fitted in the insertion recess 24a of the bottom casing 6. The insertion of the inserting portion 27 bends the elastic piece 23a toward the motor 7, and causes both pressing pieces 23c to press against the motor 7. Both pressing pieces 23c restrict the movement of the motor 7 in the axial direction, thereby securely holding the motor 7 in the receiving recess 8 of the bottom casing 6. In addition, as the inserting portion 27 is fixed in the insertion recess 24a, the right end portion of the inner plate 26 is held by the bottom casing 6.

The inner plate 26 further has, at its left end portion, a base portion 30 protruding upward. A ring-shaped second positioning recess 29 is formed in the bottom of the base portion 30. A coil spring 25 is disposed between the toothed wheel 11 and the base portion 30. The coil spring 25 has its lower end engaged with the first positioning recess 23 of the toothed wheel 11, and its upper end engaged with the second positioning recess 29.

The coil spring 25 urges the toothed wheel 11 downward, to press it against the bottom wall of the receiving aperture 10. When the toothed wheel 11 is caused to turn by the driven motor 7, the plunger 16 slides upward and downward based on the engagement between the internal thread 14 and the external thread 15.

Figure 10:
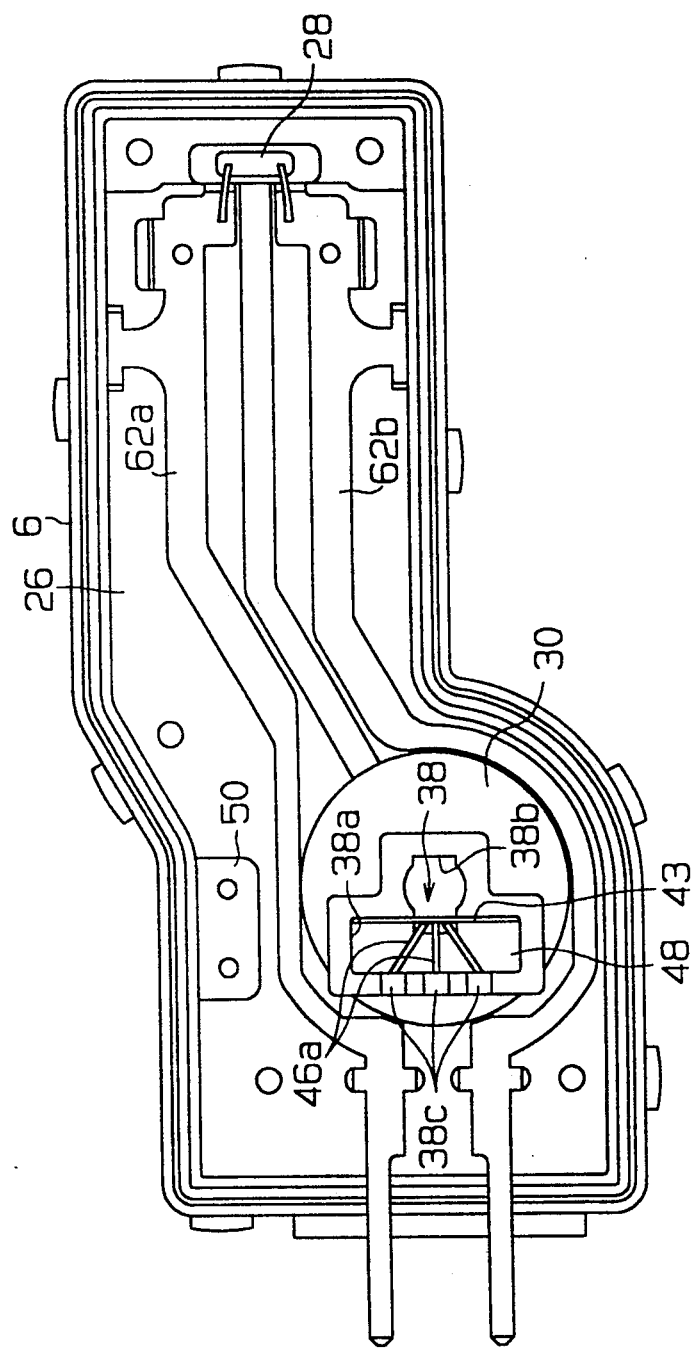

A pair of conductors 62a and 62b are provided on the top of the inner plate 26 as shown in FIG. 10. The conductors 62a and 62b have their distal ends protruding outside the bottom casing 6. The conductors 62a and 62b are connected to the motor 7 and the first capacitor 28.

Figure 11:
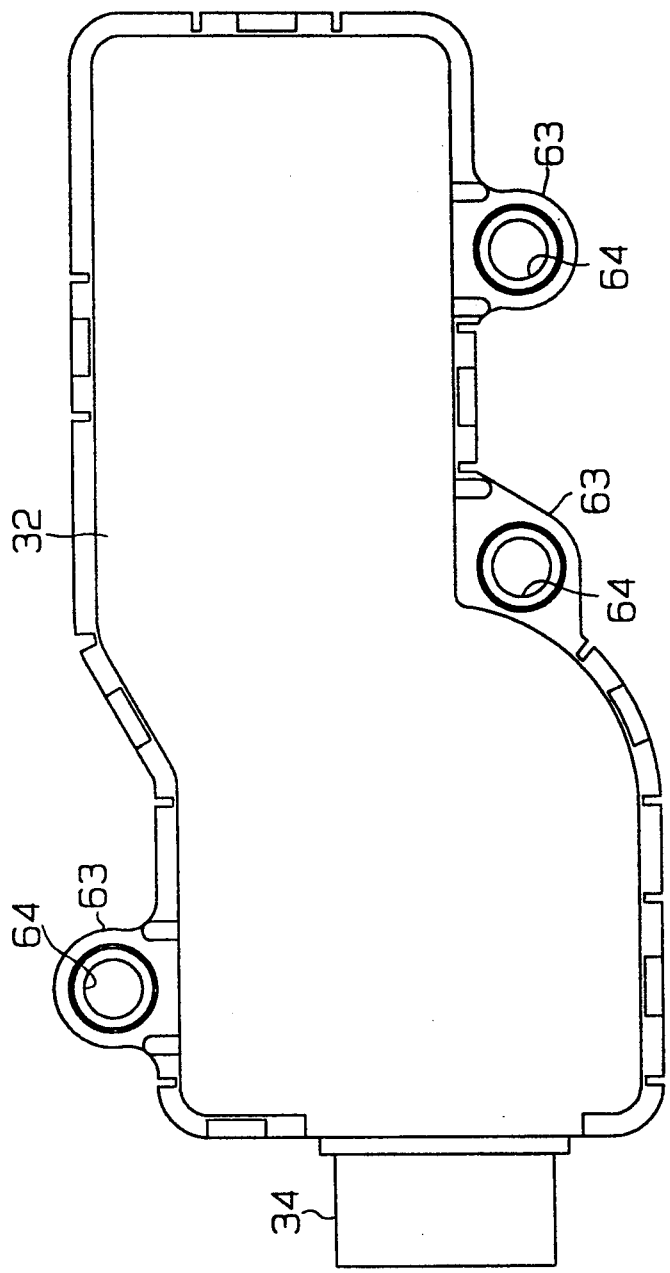

A cover 32 is attached to the bottom casing 6 via a gasket 31. As shown in FIG. 11, the cover 32 has a flange 63 formed integrally along its periphery. A plurality of holes 64 are formed in the flange 63. The actuator 5 is secured in the engine room by fastening the bolts on predetermined positions in the engine room of the vehicle, via the flange 63.

As shown in FIG. 1, a plug member 34 of connector (34,35) is attached, via a gasket 33, between the bottom casing 6 and the cover 32 at the left end portion of the actuator 5. The distal end portions of the conductors 62a and 62b are arranged in the connector plug member 34. The connector plug member 34 is connected via a socket member 35 of connector (34,35) (illustrated by a broken line) to an electric control unit (ECU) 36 which electronically controls the engine and the automatic transmission. Accordingly, the motor 7 is electrically connected to the ECU 36 via the connector (34,35), and is driven under the control of the ECU 36.

As shown in FIGS. 1 and 4, the connector plug member 34 has an extended protuberance 37 horizontally protruding toward the right direction. This extended protuberance 37 is engaged with the left end portion of the inner plate 26. When the connector plug member 34 is attached to the cover 32 and the bottom casing 6, the extended protuberance 37 presses the left end portion of the inner plate 26, thus stably holding the inner plate 26 on the bottom casing 6.

The base portion 30 has space 38 defined at the upper portion thereof, as shown in FIG. 10. This space 38 includes of first space 38a occupying a generally rectangular plane and second space 38b occupying a generally square-shaped plane. The first and second spaces 38a and 38b are defined by a plane-like metal separator 43 located in the first space 38a. A plurality of slits 38c are formed in the wall of the base portion 30 which adjoins the first space 38a.

The base portion 30 further has a bore 39 formed at the position corresponding to the second space 38b, as shown in FIG. 1. A sleeve portion 40 formed on the top of the toothed wheel 11 is fitted rotatably in the bore 39. An adjusting screw 41 is fastened in the sleeve portion 40, against the urging force of a regulating spring 42, and is disposed between the toothed wheel 11 and the adjusting screw 41. The adjusting screw 41 is long enough to protrude upward from the upper end portion of the sleeve portion 40. As the toothed wheel 11 rotates, the adjusting screw 41 rotates in relation to the toothed wheel 11.

Figure 5:
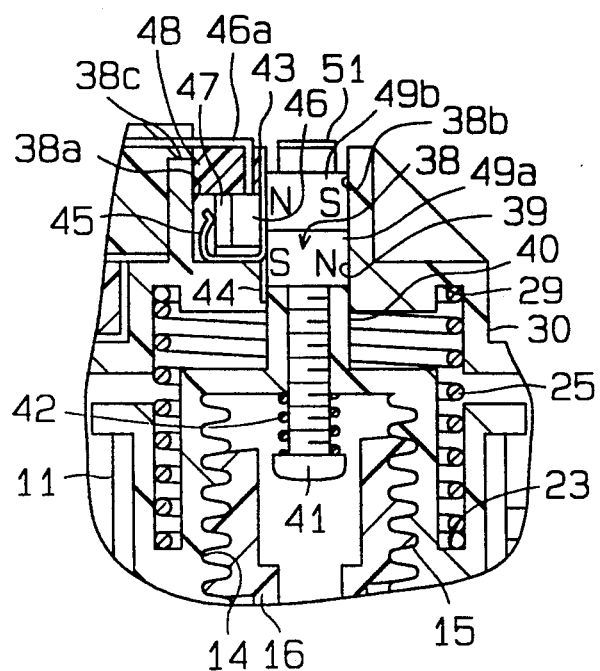

As shown in FIG. 5, the separator 43 has, at its lower center portion, an insertion piece 44 to be fitted in the base portion 30 and a pair of supports 45 (see FIG. 18) formed on the corresponding sides of the insertion piece 44 and bent toward the first space 38a. The supports 45 hold a Hall element 46 and a back yoke 47 of metal, adjoining to the element 46.

A resin cap 48 is attached to the top of the first space 38a. This cap 48 stably holds the Hall element 46 in the first space 38a. The Hall element 46 has output terminals 46a running along the interior of the cap 48.

Figure 6:
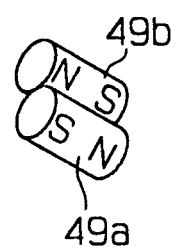
Figure 7:
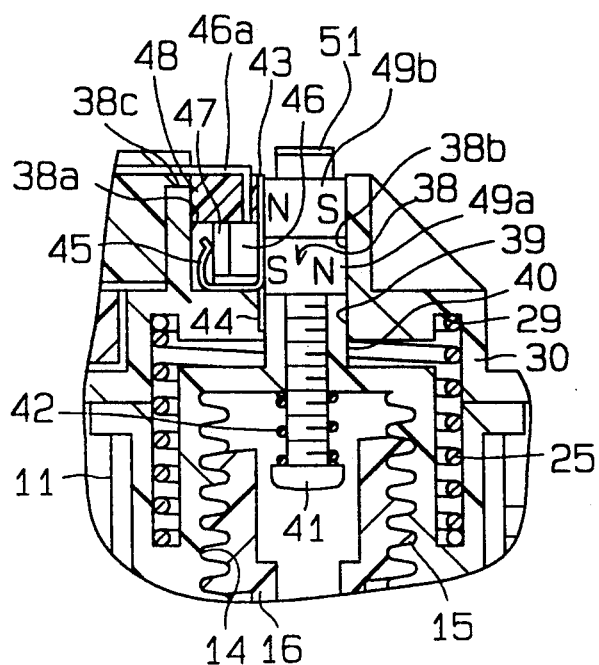

A pair of cylindrical magnets 49a and 49b are shown in FIG. 6 and are retained slidably in the second space 38b. In this embodiment, both magnets 49a and 49b are arranged in such that the S pole of the lower magnet 49a and the N pole of the upper magnet 49b face the Hall element 46.

A flat spring 51 has its proximal end secured on a bed 50 formed on the inner plate 26, as shown in FIGS. 3 and 10. The flat spring 51 has a distal end 51a bent downward to abut on the magnet 49b. In other words, the flat spring 51 presses both magnets 49a and 49b downward, so that the magnets 49a and 49b lying side by side are held in the bore 39 steadily between the adjusting screw 41 and the flat spring 51.

A pair of walls 52 are formed on the top of the extended protuberance 37 of the connector plug member 34, in such a manner as to run parallel to the lengthwise direction of the actuator 5, and apart from each other at a distance equal to the width of the first space 38a. Receiving space 53 is defined by the walls 52 and the wall forming the first space 38a.

As shown in FIG. 1, a second capacitor 54 is secured in the receiving space 53 by an adhesive 55, for electrically protecting the Hall element 46. The second capacitor 54 is connected to the output terminals 46a of the Hall element 46 placed in the slits 38c. Part of the adhesive 55 fills the receiving space 53 and enters the slits 38c to be adhered to part of the side of the cap 48.

According to the thus constituted actuator, when the acceleration pedal 3 is thrust forward, the control lever 4 turns in the direction away from the plunger 16 (in the direction opposite to the direction P). As a result, the pressing force of the control lever 4 on the plunger 16 is removed, so that the toothed wheel 11 and the plunger 16 are settled at the initial positions shown in FIG. 1, by the action of the coil spring 25. At this time, the magnets 49a and 49b are also put to the initial positions shown in FIGS. 1 and 5, by the action of the flat spring 51.

As the thrusting force on the acceleration pedal 3 is released, the control lever 4 is gradually turned in the direction to approach the plunger 16 (in the direction P). When the driver's foot is removed from the acceleration pedal 3, the control lever 4 is turned further in the direction P, pushing the plunger 16 upward. The upward movement of the plunger 16 shifts the toothed wheel 11 and the magnets 49a and 49b to the positions shown in FIG. 7, against the forces of the coil spring 25 and flat spring 51.

The operation actions of the above actuator 5 will now be described.

When the acceleration pedal 3 is thrust forward at the time the engine is activated, the control lever is turned in the direction opposite to the direction P, in accordance with the thrust amount. In this case, both magnets 49a and 49b do not shift and are held at the positions shown in FIGS. 1 and 5. The Hall element 46 therefore merely detects the N pole of the magnet 49b, and does not detect a change in the magnetic flux, which is otherwise caused by the upward/downward movement of the magnets.

The Hall element 46 outputs a detection signal to the ECU 36 via the connector (34,35). Based on the detection signal from the Hall element 46, the ECU 36 detects the adjustment of the opening of the throttle valve 2. In this case, the ECU 36 inhibits the rotation of the toothed wheel 11 by stopping the motor 7, and does not perform opening control of the throttle valve 2 (i.e., idling control of the engine) using the actuator 5.

When the acceleration pedal 3 is fully released, the control lever 4 turns in the direction P, and pushes the plunger 16 upward. The toothed wheel 11 moves upward together with the adjusting screw 41, against the urging force of the coil spring 25, and causes the magnets 49a and 49b to slide upward. Due to the movement of the magnets 49a and 49b, the Hall element 46 detects a change in the detected magnetic flux from the N pole (magnet 49b) to the S pole (magnet 49a).

Based on a signal from the Hall element 46 indicating a change in the detected magnetic flux, the ECU 36 detects that the throttle valve 2 is fully closed. At this time, the ECU 36 drives the motor 7 to turn the toothed wheel 11. As the toothed wheel 11 turns, the plunger 16 moves downward based on the engagement of the internal thread 14 with the external thread 15, thus pushing the control lever 4 downward through the plug stopper 21. The throttle valve 2 is caused to be opened by the rotation of the control lever 4, in the direction opposite to the direction P. As a result, the degree of opening of the throttle valve 2 is determined as a function of the amount of the rotation of the motor 7. This opening control maintains the idling speed of the engine at a generally constant level.

In other words, even when the driver steps off the acceleration pedal 3, the ECU 36 adjusts the degree of opening of the throttle valve with the actuator 5, to prevent air supply to the engine from being cut off. Air is therefore kept supplied to the engine, and prevents the air-fuel ratio from becoming rich. The proper control of the air-fuel ratio results in accomplishing stable idling of the engine.

Unlike the conventional art, since the position of the throttle valve 2 is detected on the basis of the detection of magnetic flux by the Hall element 46, according to this embodiment, the positional detection of the throttle valve 2 will not be disabled by any foreign matter entering the actuator 5.

In this embodiment, the Hall element 46 detects a change in magnetic flux caused by the sliding displacement of the two magnets 49a and 49b, which are arranged adjacent to each other such that adjoining magnetic poles are different from each other. Even if the amount of displacement of the plunger 16 (the amount of displacement of the magnets 49a and 49b) is small, the Hall element 46 can detect change in the magnetic flux, as will be described later in greater detail with reference to FIG. 8.

Figure 8:
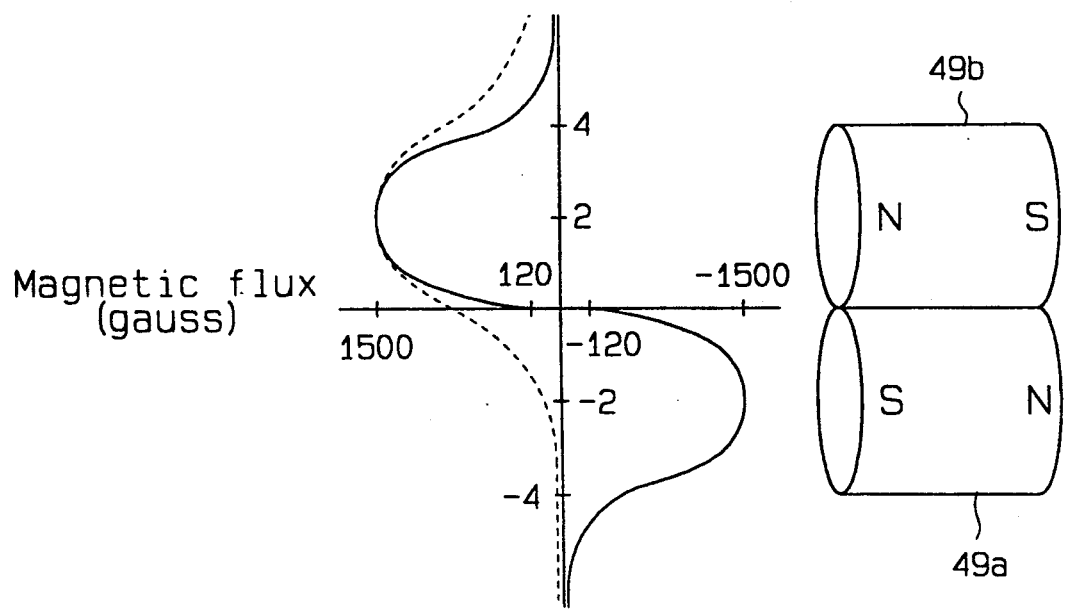

FIG. 8 is a graph showing the relationship between the distance from the adjoining portion of two magnets 49a and 49b, and the magnetic flux at individual points. The solid-line locus represents the distribution of the magnetic flux of the two magnets 49a and 49b. The distribution of the solid-line locus includes a portion in the vicinity of the adjoining portion, in which a change in the magnetic flux is significantly large due to the adjacent arrangement of the magnets. The broken line represents the distribution of the magnetic flux in the case where the lower magnet 49a is removed and only the upper magnet 49b is present.

The Hall element 46 used in this embodiment detects the magnetic flux in the range of 0 to 120 gauss. Therefore, the greater a change in the magnetic flux becomes with respect to the sliding displacement of the magnets, the more accurately the Hall element 46 can detect the change in the magnetic flux even with slight displacements of the magnets. In the actual measurement, the ratio of the change in the magnetic flux in the range of 0 to 120 gauss is approximately 1000 gauss/mm with two magnets 49a and 49b, and approximately 100 gauss/mm with one magnet 49b.

As shown in FIGS. 9(A) and 9(B), there is a magnetic flux on the left side of the magnet pair (49a,49b) facing the Hall element 46. The magnetic flux includes magnetic lines that are generally circularly curved from the N pole of the upper magnet 49b to the S pole of the lower magnet 49a. As the magnet pair (49a,49b), having a magnetic flux distribution illustrated by the solid-line in FIG. 8, slides, the Hall element 46 detects a change in the magnetic flux, as a function of that distribution.

In FIG. 9(A), the magnetic lines towards the left from N pole (magnet 49b), which corresponds to the upper half area of the magnetic flux distribution in FIG. 8, penetrate the center of the Hall element 46. Then, the Hall element 46 mainly detects the magnetic flux directed to the left. In FIG. 9(B), the magnetic lines back to S pole (magnet 49a) from the left side, which corresponds to the lower half area of the magnetic flux distribution in FIG. 8, penetrate the center of the Hall element 46. Accordingly, the Hall element 46 mainly detects the magnetic flux directed to the right.

When the magnet pair slides between the positions in FIGS. 9(A) and 9(B), the direction of the magnetic flux across the Hall element 46 is always reversed. Even when the slight displacement of the magnet pair, the Hall element 46 therefore experiences a sudden change in the magnetic flux, resulting in an accurate detection.

On the contrary, when only one magnet is used, the Hall element does not experience the reversal in the direction of the magnetic flux. Therefore, the Hall element facing only one magnet is not sensitive to the slight displacement of the magnet, and cannot always detect the magnet which reaches a determined position. Every time the magnet slides upward/downward, the Hall element often detects the magnet at a position different from the prior detected position. Such irregular detections are disadvantageous to an accurate idling control.

According to this embodiment, by including a pair of magnets 49a,49b, the position at which the Hall element 46 detects the magnet pair is always constant. Therefore, once an initial position of the magnet pair is accurately set so that the detection of a change in the magnetic flux by the Hall element 46 is synchronized with a full closing of the throttle valve 2, the Hall element 46 can detect its full closure accurately and rapidly.

It is apparent from the above that the use of two magnets 49a and 49b allows the Hall element 46 to accurately detect minor displacements of the plunger 16. This further reduces the size of the actuator 5. If it is possible to secure a large stroke of the plunger 16, only a single magnet 49a (or 49b) may be sufficient. At least three magnets arranged in series may be used, in such a way that each adjoining magnetic poles is different from one another.

In this embodiment, the metal back yoke 47 located at the back of the Hall element 46, attracts more magnetic flux generated from the magnets 49a and 49b. The magnetic energy which the Hall element 46 detects therefore increases, and improves the sensitivity of the Hall element 46.

Before the sealing plug 20 and plug stopper 21 are mounted in the first and second through openings 17a and 19 of the plunger 16 (the state shown in FIG. 4), the adjusting screw 41 can be turned to slide upward or downward with respect to the sleeve portion 40 of the toothed wheel 11. According to this embodiment, therefore, the positions of both magnets 49a and 49b pressed by the flat spring 51 can easily be adjusted by the adjusting screw 41.

In this embodiment, part of the adhesive 55 filled in the receiving space 53 also enters the slits 38c to be adhered to part of the side of the cap 48. Even when the vehicle vibrates, therefore, the cap 48 will not be detached from the first space 38a because of the adhesive 55. To the contrary, when the cap 48 is removed to replace the Hall element 46, the cap 48 can easily be detached from the first space 38a, since the coupling of the adhesive 55 to the cap 48 is easily broken.

When the control lever 4 rotating in the direction P abuts on the plunger 16, the impact is transmitted to the cover 32 via the bottom casing 6 and the inner plate 26. The gaskets 31 and 33 disposed between the inner plate 26 and the covering 32 buffer the impact to be transmitted from the inner plate 26 to the covering 32. This reduces the impact transmitted by the cover flange 63, to the bolts, for securing the cover 32 in a given position in the engine room. This means that the actuator 5 can be attached firmly in the engine room. Since the flange 63 does not need to be wide, the cover 32 can be made lighter and more compact.

Second Embodiment

Figure 12:
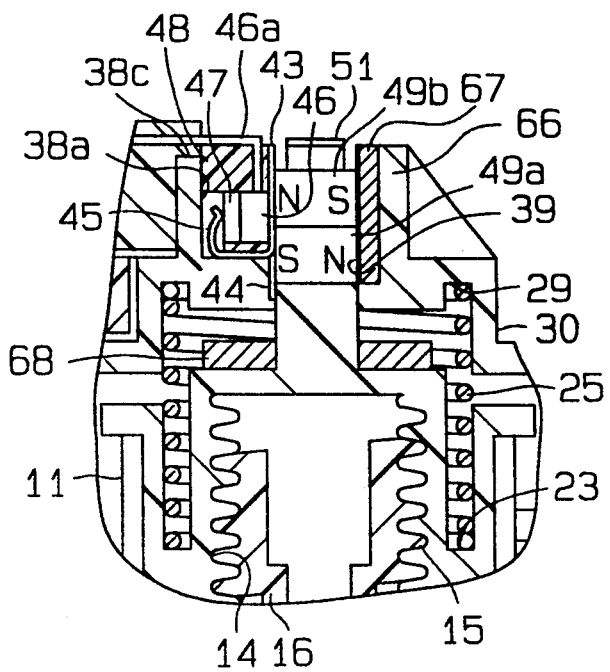
Figure 13:
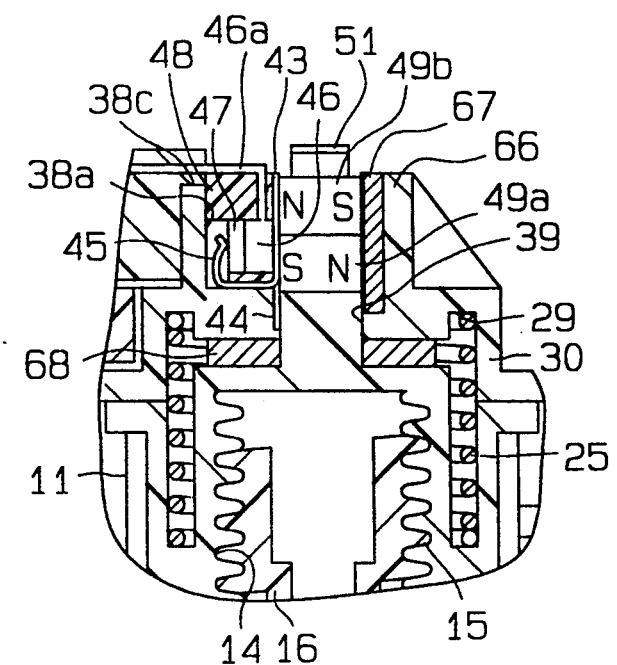
Figure 14:
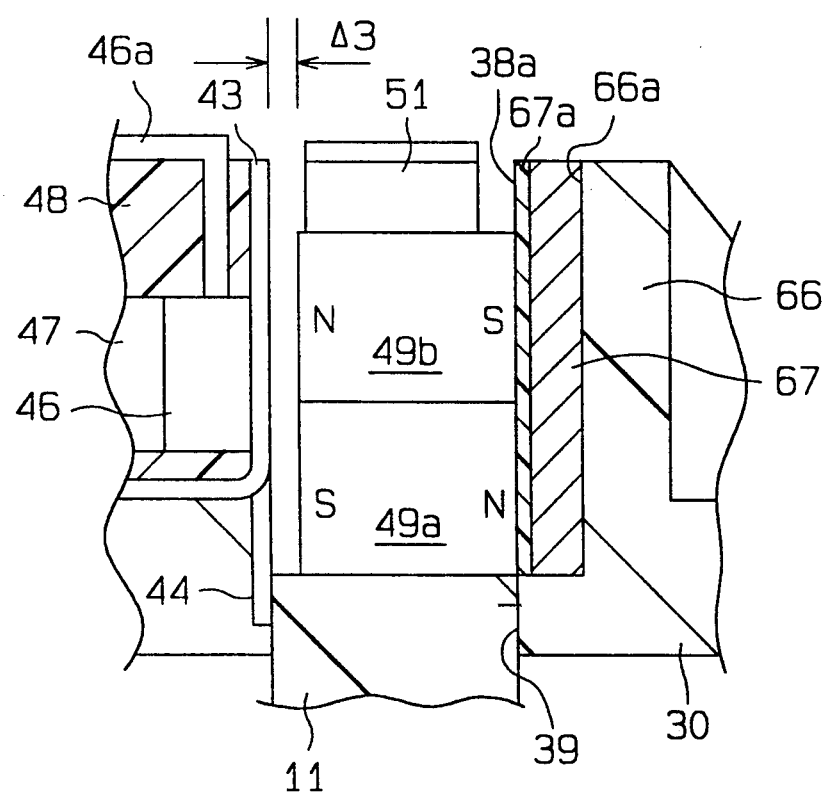

The arrangement in the vicinity of the base portion 30 of the inner plate 26 in the actuator of the first embodiment may be modified as shown in FIGS. 12 through 14.

As shown in FIG. 14, a recess 66a is formed in a wall 66 which faces the Hall element 46 and which defines the second space 38b. An iron piece 67 is fixed in the recess 66a, with a resin layer 67a for covering the exposed surface of the iron piece 67. The layer 67a is made of resin, such as nylon or Teflon, which has excellent contact slidability and wear resistance. The iron piece 67 may be replaced with a piece made of another metal or magnetic alloy.

The magnets 49a and 49b firmly stick to the iron piece 67 via the resin layer 67a due to their own magnetic force. As the plunger 16 and the toothed wheel 11 move upward or downward, both magnets 49a and 49b slide along the iron piece 67, as shown in FIGS. 12 and 13.

Figure 15:
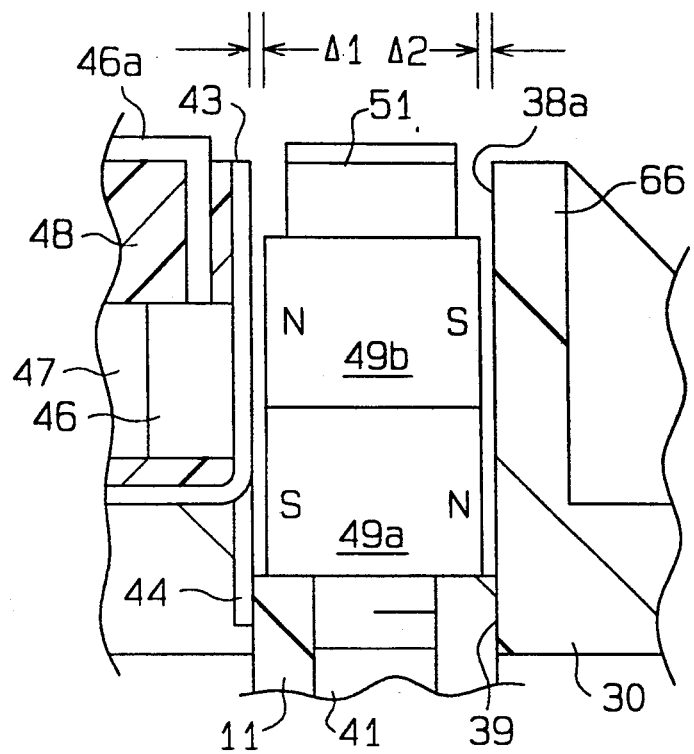

FIG. 15 illustrates the support structure of the slidable magnets 49a and 49b, which does not include the aforementioned iron piece 67. In this structure, there can be clearances $\Delta_1$ and $\Delta_2$, respectively, between the left end faces of the magnets 49a and 49b and the separator 43, and between right end faces of the magnets 49a and 49b and the wall 66. The clearances $\Delta_1$ and $\Delta_2$ permit both magnets 49a and 49b to slide upward or downward.

Figure 16:
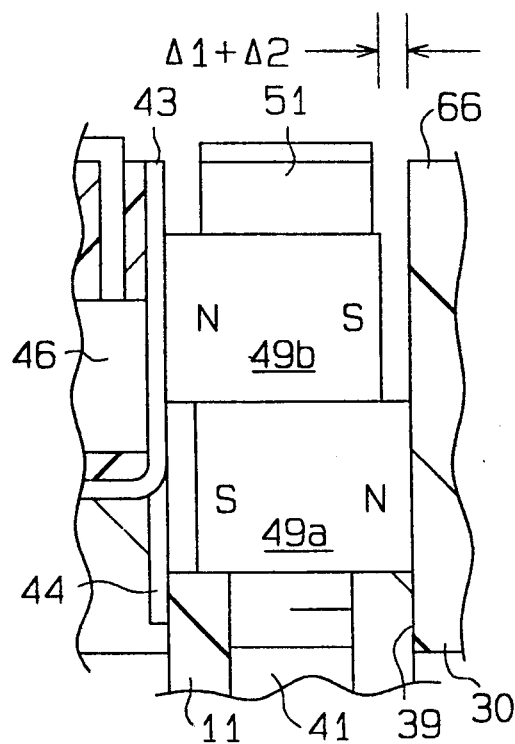
Figure 16:
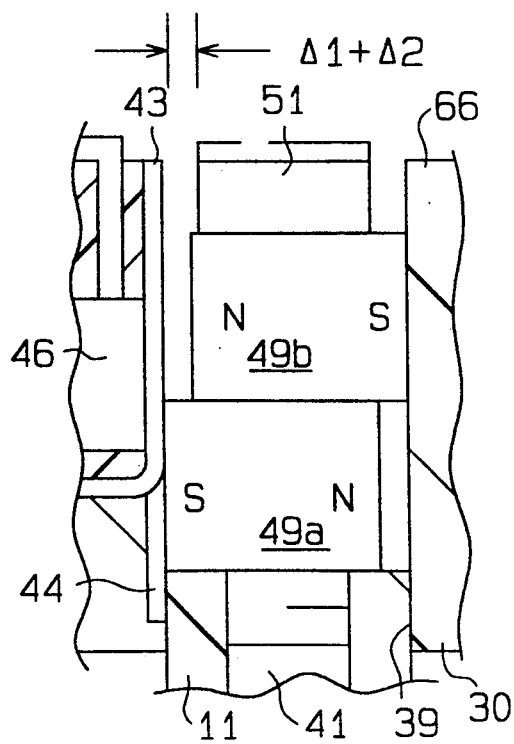

The clearances $\Delta_1$ and $\Delta_2$ may however cause the magnets 49a and 49b to shift horizontally as shown in FIGS. 16(A) and 16(B). The conditions illustrated in FIGS. 16(A) and 16(B) cause a difference in the magnetic influences of each magnets 49a and 49b on the Hall element 46. If each magnet 49a or 49b freely shifts in the horizontal direction due to the vibration of the actuator 5 or the like, the Hall element 46 cannot reliably detect the magnetism of the magnets 49a and 49b. In the worst event, even if the magnets 49a and 49b have not made upward/downward displacement, the Hall element 46 detects a change in the magnetism caused by the horizontal displacement of the magnets 49a and 49b, which has probably resulted from a malfunction of the actuator 5.

According to the second embodiment, however, both magnets 49a and 49b are firmly drawn to the iron piece 67, so that a clearance $\Delta_3$ between the left end faces of the magnets 49a and 49b and the separator 43 can always be held constant under any circumstance, as shown in FIG. 14. It is therefore possible to effectively prevent the mentioned erroneous detection by the Hall element 46 (i.e., malfunction of the actuator 5).

Furthermore, as shown in FIG. 12, the adjusting screw 41 and the regulating spring 42 in the first embodiment are not used, and a ring 68 is provided between the top of the toothed wheel 11 and the base portion 30, in the second embodiment. When the toothed wheel 11 moves upward, together with the plunger 16, the ring 68 abuts on the bottom of the base portion 30, and restrict their upward movement, as shown in FIG. 13. The use of the ring 68 can thus allow the upward stroke of the plunger 16 to be set in accordance with the thickness of that ring. The use of the ring 68 contributes to simplifying the structure of the upper portion of the toothed wheel 11 as compared with the structure which uses the adjusting screw 41 and the regulating spring 42.

Although only two embodiments of the present invention have been described herein, it should be apparent to those skilled in the art that the present invention may be embodied in many other specific forms without departing from the spirit or scope of the invention. Particularly, it should be understood that the present invention can be applied to a carburetor type engine as well as a fuel injection type engine. Although the Hall element 46 is fixed and both magnets 49a and 49b are arranged slidably in the first and second embodiments, the structure of the actuator may be modified so that the Hall element 46 is slidable and the magnets 49a and 49b are fixed.

Figure 17:
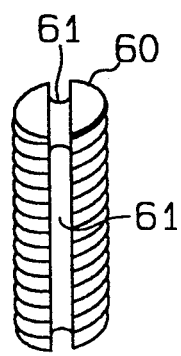

In the first embodiment, the regulating spring 42 is used to prevent the adjusting screw 41 from becoming loose. This adjusting screw 41 may be replaced with an adjusting screw 60 which has a pair of grooves 61 formed on the outer surface, and extend vertically, as shown in FIG. 17.

Figure 18:
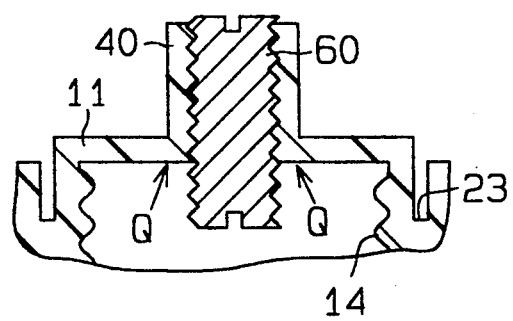

FIG. 18 illustrates how the adjusting screw 60 is attached to the sleeve portion 40 of the toothed wheel 11. As shown in FIG. 18, after the adjusting screw 60 is attached to the sleeve portion 40, so that the positions of the magnets 49a and 49b are adjusted by that screw, a portion Q around the screw 60 is heated. The portion Q of the toothed wheel 11 is melted, and the melted plastic enters the grooves 61. After the heat treatment, the melted plastic is hardened in the grooves 61, forming a rotation stopper for the adjusting screw 61. As a result, the adjusting screw 60 is prevented from becoming loose.

Figure 19:
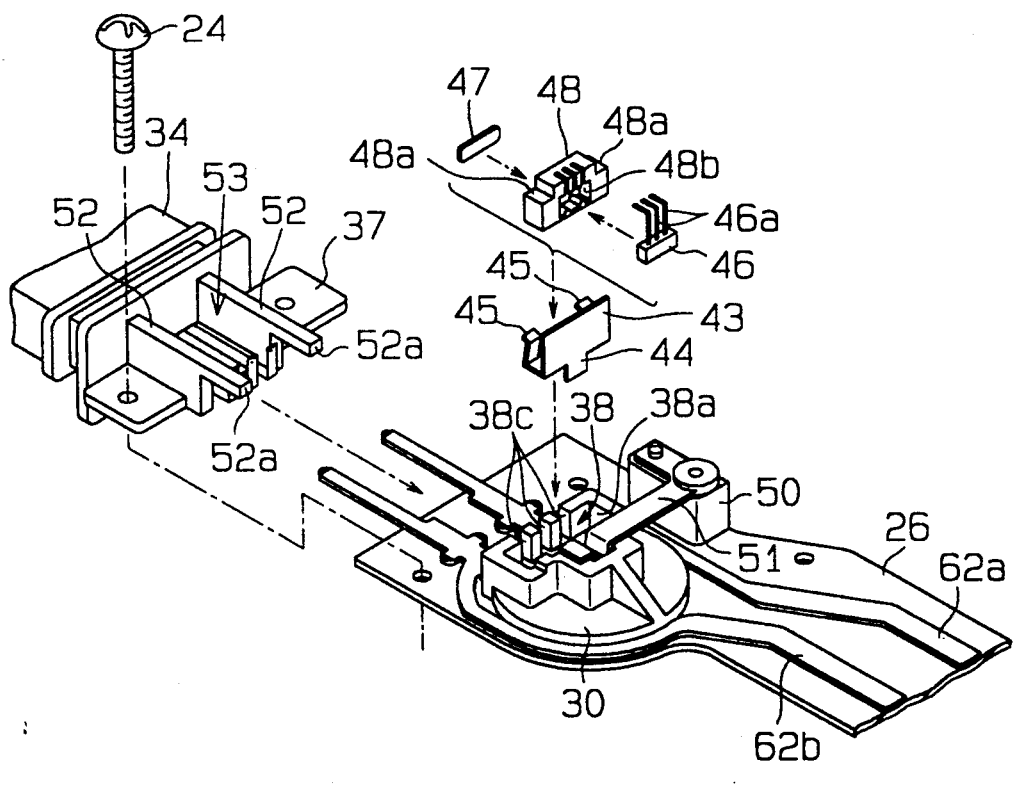
Figure 20:
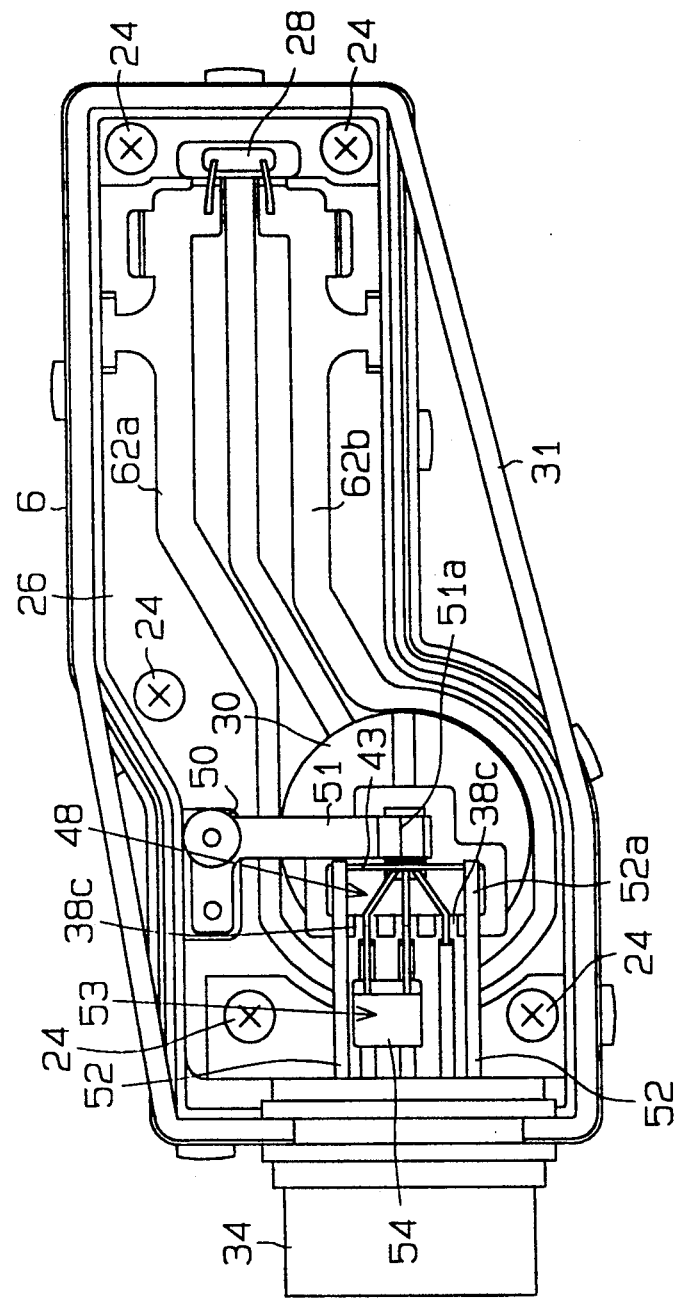
Figure 21:
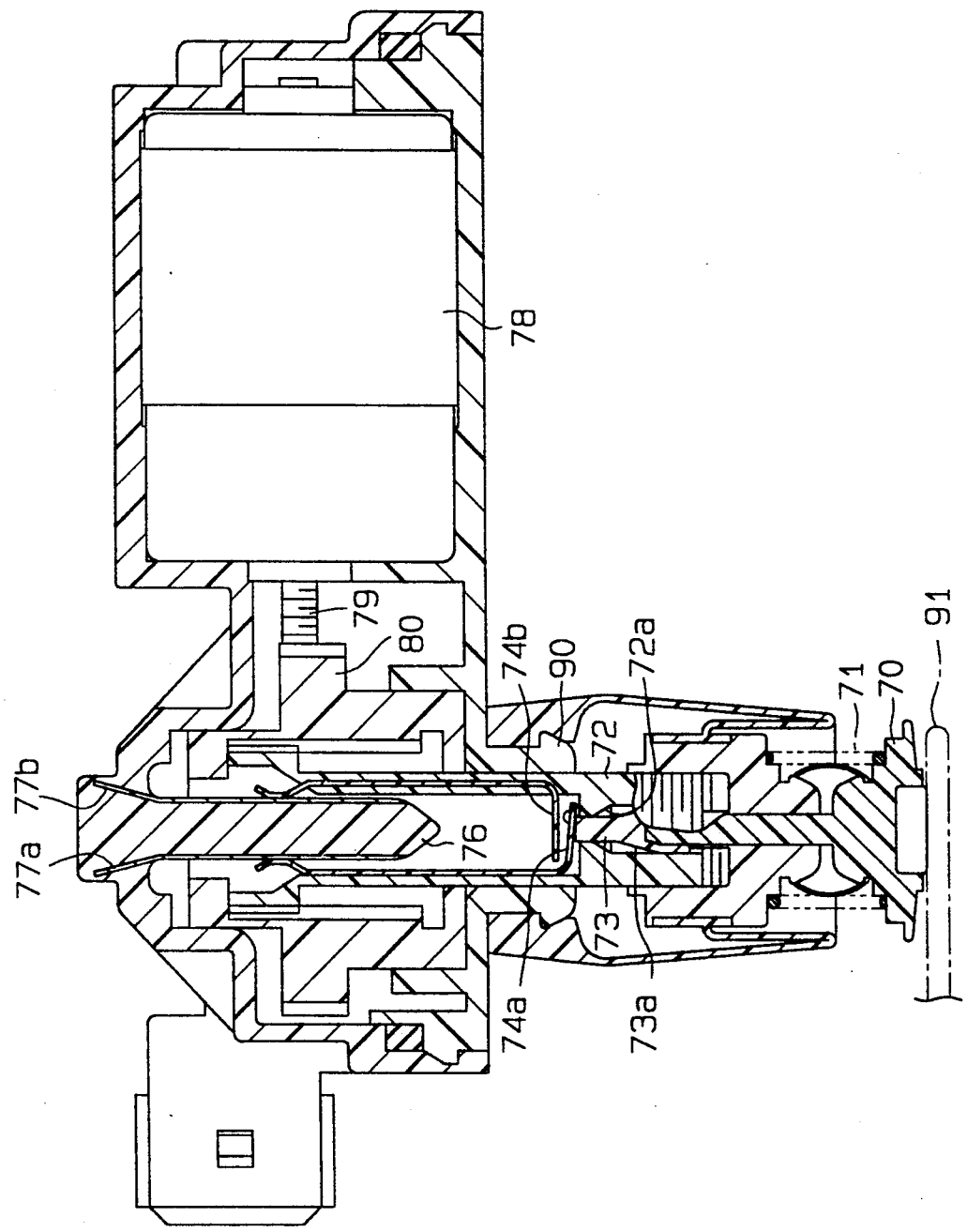
FIG. 21 is a cross section showing a conventional actuator.
Figure 22:
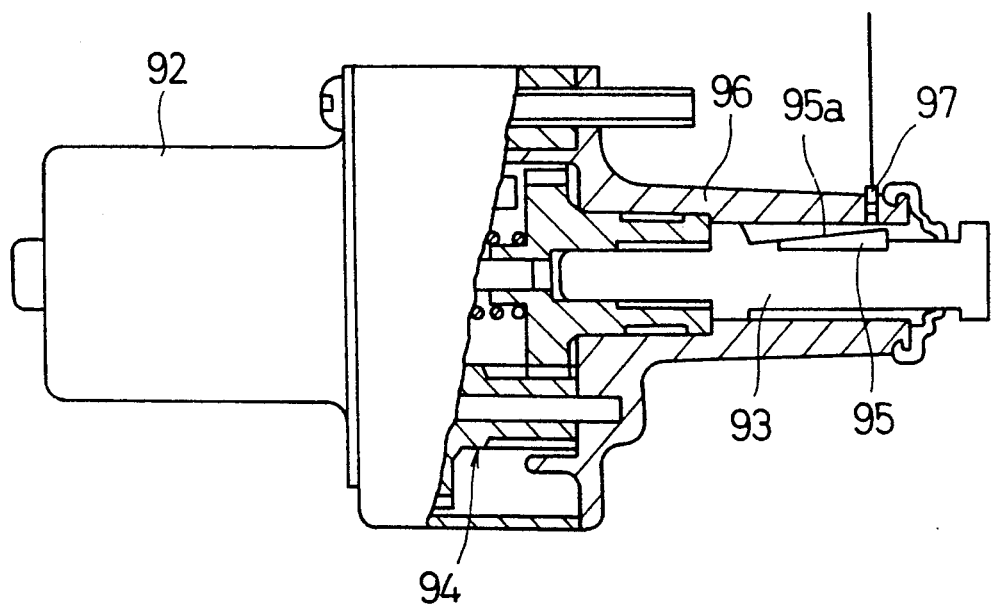
FIG. 22 is a partly cross section showing an another conventional actuator.

While the first and second embodiments employ the structure to hold the Hall element 46 in the first space 38a with the cap 48, another structure as will be discussed below may be employed. That is, a pair of steps 48a, 48a are formed on both sides of the upper portion of the cap 48, as shown in FIGS. 19 and 20. The cap 48 also includes a pocket 48b formed to accommodate the Hall element 46. The distance between a pair of walls 52 of the connector plug member 34 is selected smaller than the width of the first space 38a. Engaging portions 52a, which are to be engaged with the respective steps 48a, are protrusively formed at the tip portions of the individual walls 52.

The back yoke 47 and the cap 48 having the Hall element 46 retained in the pocket 48b, are held between the main body of the separator 48 and the support 45. The separator 43 is then pressed in the first space 38a. The connector plug member 34 is attached to the inner plate 26 by inserting the conductor pair 62a and 62b in the plug member 34. At this time, the engaging portions 52a of the walls 52 are engaged with the steps 48a. With this structure, the engaging portions 52a prevent the cap 48 from becoming disengaged from the first space, even if the cap 48 vibrates.

At the time of assembling this apparatus, when the separator 43 holding the cap 48 and the back yoke 47 is pressed in the first space 38a, the pressing force may not be sufficient. In such a case, the wall engaging portions 52a will not be engaged with the respective steps 48a. As the engagement is not made, a worker can notice that the separator 43 is insufficiently installed in the first space 38a. This is equivalent to the inspection of the assembly, to prevent shipment of unsatisfactory.

Therefore, the present examples and embodiments are to be considered as illustrative and not restrictive, and the invention is not to be limited to the details given herein.

What is claimed is:

1. An actuator for an engine idling control mechanism having a throttle valve disposed in an intake manifold tube, and a control lever to be positioned in accordance with the degree of opening of the throttle valve, the actuator comprising:
   movable plunger mechanism designed to be pushed by the control lever when the throttle valve is closed;
   drive means for forcibly moving said plunger mechanism against the pressing force of the control lever, said drive means being capable of setting the degree of opening of the throttle valve through said plunger mechanism and the control lever;
   detecting means for detecting whether the throttle valve is open or closed, said detecting means including at least two magnets and a detector for detecting the magnetic flux of said magnets;
   said magnets being arranged adjacent to each other in such that adjoining magnetic poles have opposite polarities;
   one of said magnets and said detector being movable in the same direction as said plunger mechanism, and being moved by said plunger mechanism when the throttle valve is closed, said detector detecting change in the magnetic flux when such moving occurs; and
   control means for controlling said drive means based on a result of detection done by said detecting means, to properly set the degree of opening of the throttle valve at a time the engine is idling.

2. The actuator according to claim 1, wherein said detecting means further includes a back yoke arranged such that said detector is located between said back yoke and said magnets.

3. The actuator according to claim 1, wherein said magnets are movable in said moving direction of said plunger mechanism.

4. The actuator according to claim 3 further comprising a member made of magnetic substance, for drawing said magnets by the magnetic force thereof, to keep a constant clearance between said magnets and said detector.

5. The actuator according to claim 4, wherein said magnetic member has a layer formed on the surface which contacts said magnets, said layer being made of resin material for improving the contact slidability with said magnets.

6. The actuator according to claim 1 further comprising first spring means for pressing said magnets of said detecting means toward said plunger mechanism.

7. The actuator according to claim 6, wherein said plunger mechanism includes a movable plunger member, a toothed wheel which is movable with said plunger member, and second spring means for urging said plunger member and said toothed wheel against a pressing action of the control lever.

8. The actuator according to claim 7, wherein said magnets of said detecting means is placed on said toothed wheel, and said toothed wheel has an adjusting screw for adjusting the relative position of said magnets to said detector.

9. The actuator according to claim 7, wherein said plunger means further includes a regulating member (68), provided between said toothed wheel, and a member for supporting said magnets and said detector, for restricting the relative movement of said magnets to said detector.

10. The actuator according to claim 1, wherein said detecting means includes a Hall element.

11. An engine idling control mechanism comprising:
a throttle valve disposed in an intake manifold tube;
a control lever to be positioned in accordance with the degree of opening of said throttle valve;
movable plunger mechanism designed to be pushed by said control lever when said throttle valve is closed;
detecting means for detecting a moving motion of said plunger mechanism, said detecting means including at least two magnets and a detector for detecting the magnetic flux of said magnets;
said magnets being arranged adjacent to each other in such that adjoining magnetic poles have opposite polarities; and
one of said magnets and said detector being movable in the same direction as said plunger mechanism, and being moved by said plunger mechanism when said throttle valve is closed, said detector detecting a change in the magnetic flux when such moving occurs.

12. The control mechanism according to claim 11, wherein said detecting means further includes a back yoke arranged so that said detector is located between said back yoke and said magnets.

13. The control mechanism according to claim 11, wherein said magnets are movable in the moving direction of the plunger mechanism; and
the control mechanism further comprises a member made of magnetic substance, for drawing said magnets by the magnetic force thereof, to keep a constant clearance between said magnets and said detector.

14. The control mechanism according to claim 13, wherein said magnetic member has a layer formed on the surface which contacts said magnets, said layer being made of resin material for improving the contact slidability with said magnets.

15. The control mechanism according to claim 11, wherein said detector includes a Hall element.

16. A detecting device for detecting a moving motion of a movable member, the detecting device comprising:
at least two magnets arranged adjacent to each other such that adjoining magnetic poles have different polarities;
detecting means for detecting the magnetic flux of said magnets; and
one of said magnets and said detecting means being movable in the same direction as the movable member, and being moved by the movable member, wherein when such moving occurs, said detecting means detects a change in the magnetic flux generated by said adjoining magnets.

17. The detecting device according to claim 16 further comprising a back yoke arranged such that said detecting means is located between said back yoke and said magnets.

18. The detecting device according to claim 16, wherein said magnets are movable in said moving direction of the movable member; and
the detecting device further comprising a member made of magnetic substance, for drawing said magnets by the magnetic force thereof, to keep a constant clearance between said magnets and said detecting means.

19. The detecting device according to claim 18, wherein said magnetic member has a layer formed on the surface which contacts said magnets, said layer being made of resin material for improving the contact slidability with said magnets.

20. The detecting device according to claim 16, wherein said detecting means includes a Hall element.

* * * * *